US006462549B1

(12) United States Patent
Curtis et al.

(10) Patent No.: US 6,462,549 B1
(45) Date of Patent: Oct. 8, 2002

(54) METHOD AND SYSTEM FOR ELECTROSEISMIC MONITORING OF MICROSEISMICITY

(75) Inventors: Andrew Curtis, Girton (GB); Sarah Ryan, Brookfield, CT (US); James Edward Martin, Rykkinn (NO)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/547,649

(22) Filed: Apr. 12, 2000

(30) Foreign Application Priority Data

Apr. 21, 1999 (GB) .............................. 9908960

(51) Int. Cl.$^7$ .......................... G01V 1/00; G01V 3/00; G01V 3/12; G01V 3/38; G01V 11/00
(52) U.S. Cl. ...................... 324/323; 324/334; 324/338; 324/344; 324/347; 181/122; 367/14; 702/14
(58) Field of Search .................... 324/323, 334–338, 324/344–350; 367/14; 181/101, 122; 702/14, 15

(56) References Cited

U.S. PATENT DOCUMENTS

| 3,173,086 | A | * | 3/1965 | Kresge ..................... 324/535 |
| 3,975,674 | A | | 8/1976 | McEuen |
| 4,904,942 | A | * | 2/1990 | Thompson .................. 324/323 |
| 5,486,764 | A | | 1/1996 | Thompson et al. |
| H1561 | H | | 7/1996 | Thompson |
| 5,625,348 | A | | 4/1997 | Farnsworth et al. |
| 5,694,129 | A | | 12/1997 | Fujinawa et al. |
| 5,742,166 | A | | 4/1998 | Park |

FOREIGN PATENT DOCUMENTS

| EP | 0 512 756 A1 | 11/1992 |
| GB | 2 226 886 A | 7/1990 |
| GB | 2 326 717 A | 12/1998 |
| WO | 97/14980 | 4/1997 |

OTHER PUBLICATIONS

Thompson, A. H., et al.; Geophysical applications of electrokinetic conversion; The Leading Edge, Dec. 1993, pp. 1169–1173.

Web page print–out dated Nov. 11, 1998: www.pcweb.liv.ac.uk/Microseis/case/ Department of Earth Sciences, University of Liverpool.

Mikhailov, Oleg V., et al; Electroseismic investigation of the shallow subsurface: Field measurements and numerical modeling; Geophysics vol. 62, No. 1 (Jan.–Feb. 1997) pp. 97–105.

* cited by examiner

Primary Examiner—Gerard R. Strecker
(74) Attorney, Agent, or Firm—William L. Wang; William B. Batzer; John J. Ryberg (57) ABSTRACT

A method and system for determining the location of a microseismic event is disclosed. An electromagnetic sensor measures the electromagnetic energy which is caused by a microseismic event. Seismic data from the microseismic event is measured and recorded using plurality of ground motion sensors. The time at which microseismic event occurred is estimated based at least in part on the time at which electromagnetic energy caused by the microseismic event is received by the electromagnetic sensor. The location of said source of the microseismic event is determined using the estimated occurrence time and the time at which the seismic energy arrived at the ground motion sensors. A method of triggering a seismic recording device is also disclosed. The electromagnetic energy from a microseismic event is measured and recorded using an electromagnetic sensor. The time at which the microseismic event occurred is estimated based on the measured electromagnetic energy. Recording by a seismic recording device is then initiated in response to the estimated time at which the source of seismic energy occurred.

45 Claims, 5 Drawing Sheets

METHOD AND SYSTEM FOR ELECTROSEISMIC MONITORING OF MICROSEISMICITY

FIELD OF THE INVENTION

The present invention relates to the field of electromagnetic and seismic monitoring of microseismic events. In particular, the invention relates to a method and system for monitoring both electromagnetic and seismic energy from microseismic events and using the data to more accurately determine the time, location, and other characteristics of the event.

BACKGROUND OF THE INVENTION

During oil, gas or groundwater production it is often the case that fluid either injected or removed from the rock formation causes chemical, temperature or pressure changes that in turn cause the rock to fracture or fault. Fracturing or faulting emits microseismic energy, the hypocentre of which is known as a microseismic event. In general, a microseismic event is triggered by any fracturing or faulting in the rock regardless of the cause. For example, microseismic events can also be caused by mining, which alters the stress field in the Earth by removing material that would otherwise support stress. Microseismic events produce seismic waves that propagate through the surrounding rock. These seismic waves, in turn, can often be detected by particle motion detection devices on the ground surface, in water, or in boreholes.

Detecting, locating and characterizing induced microseismic events provides potentially valuable information about the structure of the subsurface, especially about the paths along which fluid is flowing. In the past, these microseismic events have been located and characterized by inverting various attributes of the seismic energy released (e.g., arrival time, phase, polarization).

However, using seismic data alone is severely deficient for characterizing microseismic fracture events for two main reasons: First, the time taken for seismic energy to propagate between the event and the particle motion sensor is appreciable and is medium-dependent. This implies that relocating events accurately depends entirely on having an excellent Earth model for seismic energy propagation. This is often not the case for compressional P wave data and is seldom the case for shear S wave data. Second, even if full waveform data is used, significant trade-offs exist between the various parameters that describe the source mechanism. An important parameter with which many others trade-off is the microseismic event source time.

It has been known for some time that electromagnetic energy could be used for seismic imaging. For example, some applications detect electromagnetic energy that comes from electrolytic fluids in the earth interacting with man-made seismic waves (see e.g., Geophysics 62, No. 1, 1997, pp. 97–105 "Electric Investigation of the Shallow Subsurface: Field Measurements and Numerical Modeling" Mikhailov, Haarsten and Toksoz.) Additionally, other applications have used man-made electromagnetic energy sources to aid in subsurface imaging (see e.g., U.S. Pat. No. 3,975,674). Still other applications have attempted to use electromagnetic energy to predict earthquakes (see e.g., U.S. Pat. No. 5,694,129 to Fujinawa et al.).

However, no effective method has been proposed for locating or characterizing microseismic events that effectively incorporates the measurement of electromagnetic and seismic energy caused by the microseismic event itself.

Another related problem is that of providing an effective triggering mechanism for remote seismic sensors. Methods of using the seismic signal itself to trigger remote seismic measurement have the disadvantage of not consistently recording the onset of seismic energy.

SUMMARY OF THE INVENTION

Thus, it is an object of the present invention to provide an effective system and method of reducing uncertainty in relocation and characterization of microseismic events though measurement of both electromagnetic and seismic energy caused by the microseismic event. It has been found that as the microseismic event occurs, a piezo-electric potential is created instantaneously as the sides of the fault or fracture move relative to each other; electrolytic fluid (often water) may also be "squirted" along the fracture or fault plane. Both of these processes produce electromagnetic (EM) signals that travel at great speeds through the surrounding rock and hence may be detected almost instantaneously by remote EM receivers in boreholes, on the ground surface, in water, or on the sea floor.

The virtually instantaneous arrival time of the electromagnetic energy greatly alleviates the fundamental trade-off problem between event time and location. Additionally, it has been found that the arrival time of the electromagnetic energy can also be used to trigger recording of the approaching seismic energy.

Advantageously, according to the invention, the travel times of all arriving phases of the seismic energy (e.g., P-waves, S-waves, and surface waves) can be determined very much more accurately and independently (since the source time is known). This, in turn, provides information that can be used to constrain the seismic velocity structure of the Earth. Additionally, the phase and vectorial components of the electromagnetic signal contain information about the character and direction of the seismic event relative to the recording sensor. It has also been found that the amplitude of arriving electromagnetic energy contains information about the conductivity of rock between the event and receiver.

According to a preferred embodiment, the equipment used to record the electromagnetic signal can be an antenna or electrode, either of which can be embodied in a resistivity array with switchable sensitivities and bandwidth. When co-located with ground motion sensors, the detection of electromagnetic source signatures can be used to trigger recording of approaching seismic energy. This can also be used to trigger recording when man-made seismic sources are activated on the surface or in remote boreholes with no real-time connection to the receivers. The equipment may be either transitory or located permanently.

According to the invention a method of determining the location of a microseismic event is provided. An electromagnetic sensor measures the electromagnetic energy, at least some of which is caused by a microseismic event that consists primarily of rock fracturing or activation of existing rock fractures. Seismic data from the microseismic event is measured and recorded using plurality of ground motion sensors. The time at which microseismic event occurred is estimated based on the time at which electromagnetic energy caused by the microseismic event is received by the electromagnetic sensor. The location of said source of the microseismic event is determined using the estimated time at which the microseismic event occurred and the time at which the earth vibrations caused by the microseismic event arrived at the ground motion sensors.

According to an alternative embodiment, a method of determining the time of occurrence of a microseismic event and triggering a seismic recording device is provided. The electromagnetic energy from a microseismic event is measured and recorded using an electromagnetic sensor. The time at which the source of the seismic energy occurred is estimated based on the time at which electromagnetic energy caused by the source of seismic energy is received by the electromagnetic sensor. Recording by a seismic recording device is then initiated in response to the estimated time at which the source of seismic energy occurred.

The present invention is also embodied in a system for determining the location of a microseismic event, and a computer readable medium that carries instructions to direct an apparatus to determine the location of a microseismic event.

DETAILED DESCRIPTION OF THE INVENTION

During production of oil, gas or groundwater, fluid is extracted. A different fluid or gas is commonly injected elsewhere to stimulate this extraction. During mining, material is removed from the Earth's subsurface that would otherwise support stress, changing the regional stress field. Extraction of oil and gas can also induce subsidence, such as has happened at Ekofisk. During either of these processes, seismic recording equipment (ground motion sensors or pressure sensors) can be distributed within boreholes or on the ground surface to monitor induced, microseismic events. The same equipment can be used to record seismic energy from man-made seismic sources on the surface or in boreholes. In addition, electromagnetic receivers (in the form of antenna coils, electrodes, or resistivity arrays) can be used to monitor the induced electromagnetic response of the microseismic or man-made seismic events.

Figure 1:
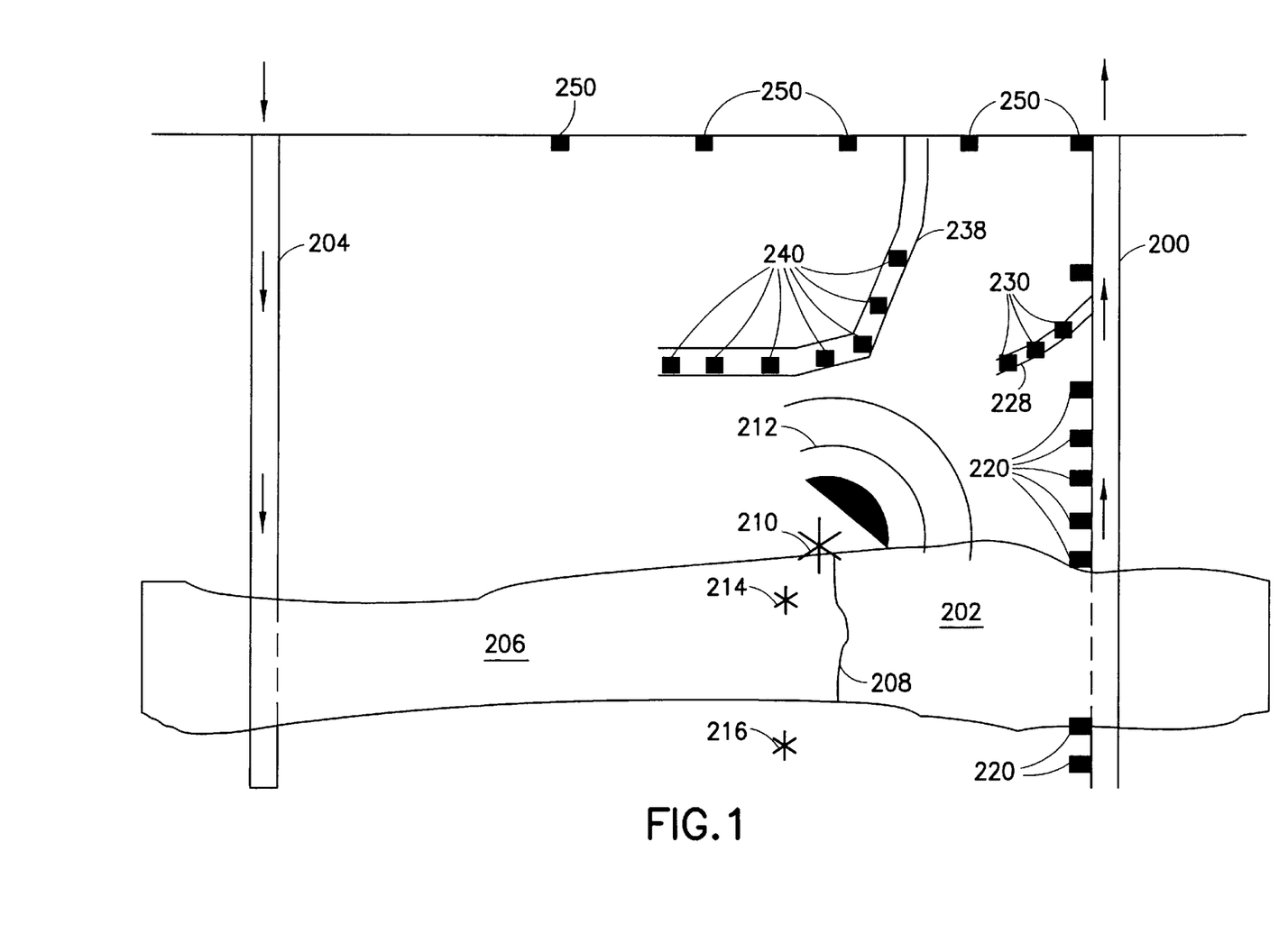
FIG. 1 schematically illustrates arrangements in which electromagnetic receivers and ground motion sensors can be used to monitor electromagnetic and seismic energy, according to a preferred embodiment of the invention.

FIG. 1 schematically illustrates various arrangements in which electromagnetic receivers and ground motion sensors can be used to monitor the induced electromagnetic and seismic response of microseismic events, according to a preferred embodiment of the invention. Producer well 200 is a borehole for producing oil from reservoir 202, but in other embodiments could be a well for producing gas, groundwater, and the like. During production of oil, water is injected through the injector well 204 into a portion of the reservoir 206, creating a water front 208 that pushes the oil towards the producer well 200. In an alternative embodiment, gas is injected through injector well 204 creating a gas front that pushes the oil towards the producer well 200. Those of skill in the art will appreciate that if gas injection is used the gas front will have a different geometry then that shown in FIG. 1. The induced temperature, chemical and pressure changes cause microseismic events, examples of which are depicted as 210, 214, and 216. In general, the microseismic events will occur at different times. Each microseismic event, in turn, creates both seismic and electromagnetic waves. In the example of FIG. 1, microseismic event 210 creates seismic and electromagnetic waves 212 that are recorded by the ground motion sensors and coil/resistivity array distributed across the ground surface and/or within boreholes as described in further detail below. According to other embodiments, the sensors can be distributed in ponds or in the sea.

Electromagnetic receivers and ground motion sensors 250 are distributed across the surface in the vicinity of the producer well 200. According to some embodiments, geophones are used for the ground motion sensors. Three or more receivers and motion sensors 250 should be used. On the ground surface, preferably four ground motion sensors are configured in a pattern such that one receiver and ground motions sensor pair is located directly over the expected locations of microseismic events, for full depth resolution, and at least three other receiver and ground motion sensor pairs are located at even intervals around a circle centered over the expected event, for lateral resolution. However, in general, any geometry in which the receivers are not placed along a straight line can provide sufficient information for locating the event. When distributed across the surface in an array, the relative amplitudes and phases of signals received at different ground motion sensors and electromagnetic receivers provides information about the event location and character, and about the conductivity of material in the Earth.

However, sensors on the surface may detect very little signal from deep events due to signal attenuation as it propagates between the event and receivers. The amount of electromagnetic attenuation can be assessed by computing or estimating the skin effect, or more specifically, the skin depth. Frequencies in the range of approximately 1–1000 Hz can be useful. The higher frequencies offer tighter constraints, but are also attenuated over a shorter distance. The skin depths for lithologies such as shale layers in the Gulf of Mexico have been estimated, assuming a conductivity on the order of 0.1 S/m to 1 S/m (where Siemens [S]=[A/V] Ampere/Volt). The expected skin depth is about 16 meters, for the most conductive layers and the frequencies of around 1000 Hz. At lower frequencies and/or lower conductivities the skin depth can range from 50 to 500 meters. Signals can be detected up to several skin depths away from the source. Thus, electromagnetic signals may be detectable up to 500 to 1000 meters from the source.

The conductivity of the rock also affects the speed at which the electromagnetic energy propagates. The more conductive the rock, the slower the energy propagates. For Gulf of Mexico shales, for instance, the range of propagation of 500 Hz energy is approximately 30 Km/s–100 Km/s. In addition, higher frequency energy also propagates faster than lower frequency energy. Hence, in some reservoir situations the velocity of propagation may be so slow that the detection of the electromagnetic pulse at a remote receiver might be delayed with respect to the actual fracture initiation time, if the fracture to receiver distance is too large.

Hence, the attenuation and velocity expected in each reservoir should be assessed independently, based on well logs of conductivity or resistivity.

In cases where the microseismic events are a considerable distance from the surface, where the conductivity or the frequency detected is high, or where the electromagnetic propagation speed is low, electromagnetic receivers and ground motion sensors 220, 230, and 240 are preferably placed within boreholes that are much closer to the microseismic event. Placing the sensors closer to the event will decrease the effects of attenuation, while providing similar types of information.

In addition, highly conductive layers between the source and electromagnetic receiver will tend to attenuate and delay the electromagnetic signal and should preferably be avoided in the survey design. For example, it will be more difficult to detect electromagnetic signals from sensors within steel-cased boreholes due to the attenuation of the casing. Also, surface noise tends to be transmitted to great depths through the casing. Hence, the preferred method for electromagnetic data acquisition in a borehole is either outside insulated sections of the casing or in uncased sections at distances approximately greater than 100 meters from the casing shoe. In general, surveys should be designed either such that the signal recorded is expected to be as large as possible, or such that the signal recorded will place the most constraints possible on a model of the Earth's (seismic or conductivity) structure.

Electromagnetic receivers and ground motion sensors 220 are located in producer well 200. These sensors can be either permanent or temporary in nature. Alternatively, the sensor can be placed in a dedicated monitoring well 238. In this embodiment, electromagnetic receivers and ground motion sensors 240 are placed in a dedicated well 238 that is located in suitable close proximity to the reservoirs 202 and microseismic events 210, 214, and 216.

A preferred alternative is to place the sensors in a lateral 228 that is an offshoot off of the main producer well 200. Electromagnetic receivers and ground motion sensors 230 are in this type of arrangement. Under some conditions the producer well 200 may be unsuitable for effective data acquisition. For example, it may be very difficult to discriminate between seismic signals caused by microseismic events and background acoustic noise in a monitoring well that has fluid moving in it. This effect may also cause severe problems for the detection of electromagnetic signals caused by microseismic events, since it is possible that the electro-acoustic coupling within a cased, fluid-filled well might be great. Thus, an advantage of placing the sensors in a lateral is that the lateral can be partially or totally sealed off from the environment of the producing or monitoring well. Fluid motion in the lateral can be halted either by cementing the whole lateral so that the receivers are installed permanently, or, by sealing the entrance to the lateral in such a way that acoustic signals from the fluid in the main well are decoupled from the fluid in the lateral. However, with the latter solution, fluid may still move within the lateral independently from the main well, causing a secondary set of local tube waves and corresponding electromagnetic noise. Such secondary tube waves can be damped within the lateral by sealing the lateral with acoustic dampers at regular intervals. For example, dampers could be placed between every pair of neighboring ground motion sensors and antennae 230.

Placing the sensors at improved locations advantageously provides much clearer definition of the volume of the Earth in which the stress field has been altered (e.g., by fluid being injected or extracted from the ground). This, in turn, provides valuable information about the aquifers along which fluids are moving.

Figure 2:
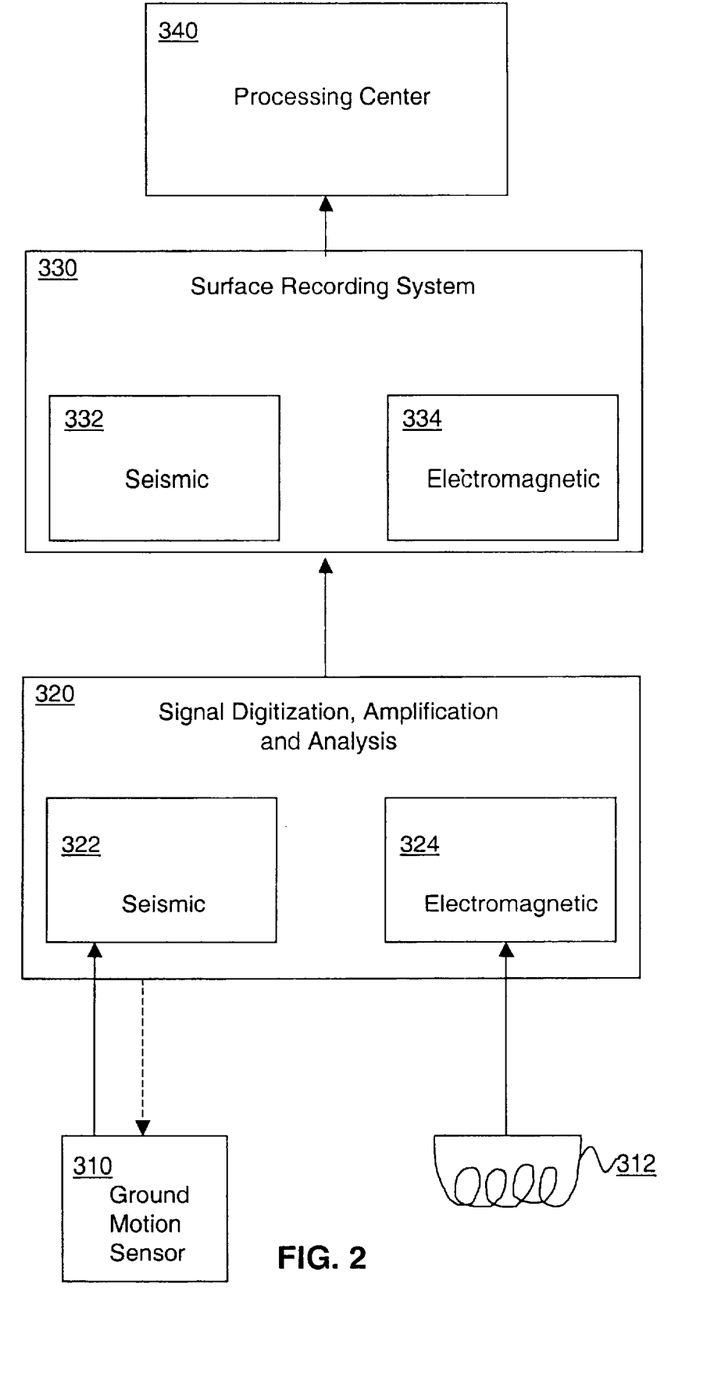
FIG. 2 schematically illustrates some of the equipment used to monitor, record, and process the electromagnetic and seismic data, according to the invention.

FIG. 2 schematically illustrates some of the equipment used to monitor, record, and process the electromagnetic and seismic data. Electromagnetic receiver 312 can take various forms. The basic equipment used to record electromagnetic signals is an antenna or electrode. A coil of wire, or indeed any non-insulated cable will be affected magnetically by passing electromagnetic waves; electrodes in contact with the surrounding rock formation can detect electrical potential variations caused by passing electromagnetic waves. Hence, the signal may even be recorded by moving coil geophones (which are a form of velocity or acceleration sensing devices). According to a preferred embodiment of the invention, several different types of recording equipment may be used alone or in combination with one another depending on the particular application.

An antennae or electrode placed on the ground surface can be large and very sensitive, and can be co-located with surface seismic receivers if necessary. A transitory borehole tool could consist of seismic energy detection profiling tool with an electromagnetic antenna or electrode attached. The seismic energy detection tool can consist of either pressure measuring devices or ground motion sensors, or both. Measurement of the microseismic events can be made either by a plurality of seismic detectors at different locations in the same well or by a plurality of seismic detectors in a number of different wells. This would advantageously allow triggering of the seismic recording system by the arrival of electromagnetic energy. Permanent antennae or electrodes may also be used. Electromagnetic permanent antennae or electrodes can be located permanently within the same wells as permanent seismic sensors as are monitors 220, 230, and 240 in FIG. 1.

Electromagnetic signals can also be sensed by resistivity switchable electrode arrays. However, the amplitude and frequency range of typical electromagnetic energy may be very different from that used to perform resistivity surveys, so equipment should preferably have switchable sensitivities and bandwidths. Note that this may be implemented with a switching device in conjunction with a conventional recording system, which is often on the ground surface. Thus, using a switchable array could avoid the use of a different sensor.

Additionally, a magneto-telluric sensitivity switch can be used. Just as the sensitivity and bandwidth of resistivity array can be switched to record expected electromagnetic signals, the equipment described above can also be switched to adjust the sensitivities and bandwidths such that they record magneto-telluric data using magneto-telluric sensitivity switch. Again, this may advantageously be implemented using only a switching device on the recording system rather than different sensors.

With respect to seismic monitoring, ground motion sensors such as ground motion sensor 310 convert the vibrations from the microseismic events into electrical signals. The ground motion sensors can detect either the pressure, pressure gradient, particle velocity, particle acceleration or particle displacement induced in the measurement medium by the microseismic event. The most preferred seismic tool would incorporate measuring devices that would measure both pressure and multi-component particle motion. The sensors are preferably made to a relatively high specification, having a known, relatively distortion free response extending between about 3 Hertz up to about 2000 Hertz. However, a maximum of up to about 450 Hertz could also be used in some situations. Additionally, the sensors preferably have little or no resonance distortion from the sonde over the same frequency range.

The above-described types of electromagnetic receivers and ground motion sensors and locations for their placement can be used alone or in combination with one another, depending upon the particular application at hand. Additionally, all of the equipment types described above can be of the type that records one component, such as amplitude, or up to three additional components, such as direction, of the arriving signal.

The electromagnetic receiver, shown schematically as 312 in FIG. 2, transmits the analog electrical signals to signal digitization and amplification unit 320. Likewise, ground motion sensor 310 transmits analog electrical signals to unit 320. In many applications, and especially where the electromagnetic receivers 312 and ground motion sensors 310 are placed together at the same locations, the signal digitization and amplification may be performed in a single unit 320. Within unit 320, however, separate units 324 and 322 may also be provided for digitizing the electromagnetic and seismic signals respectively. If the sensors are located in a borehole, unit 320 is preferably located locally in the borehole as well. If the sensors are on the surface, unit 320 should normally be located nearby on the surface.

After digitization, unit 320 amplifies the digital signals and transmits them to a central surface recording system 330. If unit 320 is located in the borehole, the digitized signals need to be transmitted to the surface using some sort of telemetry technique. This telemetry can be in the form of conventional mud pulse telemetry or some other form of low data rate transmission. Alternatively, and especially in the case of wireline or permanent sensors, the telemetry could be provided via a permanent cable to the surface.

According to a preferred embodiment of the invention, unit 320 can also provide some analysis of the electromagnetic signal in order to detect an electromagnetic impulse with the characteristics of a microseismic event. In this case, unit 320, once detecting a signal that is likely to be a microseismic event of interest, transmits a signal to the ground motion sensor 310 to begin transmitting seismic data. Alternatively, ground motion sensor 310 may be continuously transmitting the data and the detection of a suitable impulse merely activates a seismic recording system within units 320 and/or 322. The methods suitable for distinguishing an impulse from a microseismic event from the background noise are described in further detail below. Thus, according to this embodiment, the detected electromagnetic impulse is used to trigger a seismic recording system. The triggering properties of this type of system may be extremely valuable when there is no real-time connection between the seismic ground motion sensor and recording system. In this case, signals are often buffered and transmitted (usually slowly) at a later date. Efficient triggering advantageously allows shorter signals to be recorded and transmitted while still containing all relevant seismic information.

Central surface recording unit 330, is usually located at the local field site. The central recording unit typically has some data processing capability such that it can perform correlation or other processing which may be desirable for a particular application. Once the central surface recording unit 330 performs desired processing, if any, it typically stores the data in the form of time-domain traces on a magnetic tape, hard disk, or other digital storage medium. The stored data are later sent for processing and analysis to a data processing center 340, typically located in some other geographical location.

Figure 5:
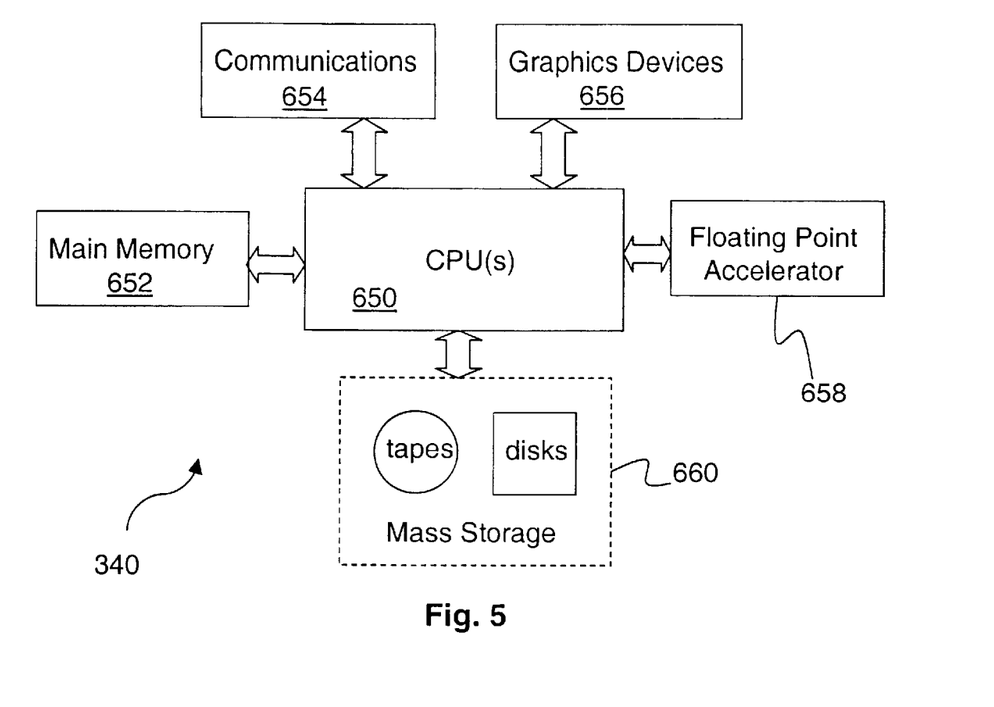
FIG. 5 schematically illustrates a possible configuration for a data processing center, according to the invention.

The processing center 340 is implemented on a digital computer preferably configured to process large amounts of data. For example, FIG. 5 illustrates one possible configuration for processing center 340. The data processor typically consists of one or more central processing units 650, main memory 652, communications or I/O modules 654, graphics devices 656, a floating point accelerator 658, and mass storage devices such as tapes and discs 660.

Figure 3:
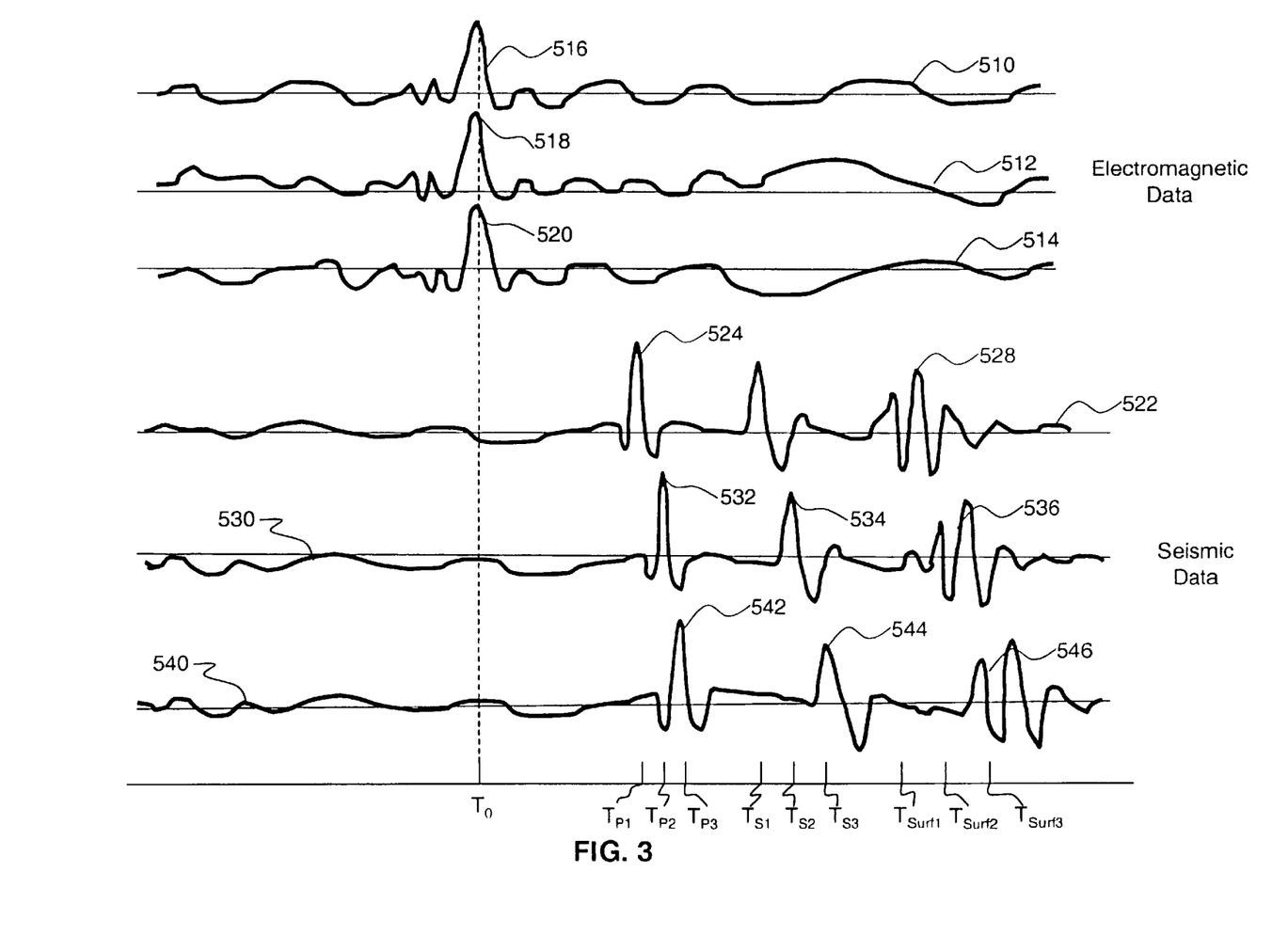
FIG. 3 illustrates some exemplary characteristics of electromagnetic signals and seismic signals as received by a processing center, according to the invention.

FIG. 3 illustrates some exemplary characteristics of electromagnetic signals and seismic signals as received by processing center 340 and plotted on a common time axis. In this example, three electromagnetic receivers are used to record traces 510, 512 and 514. The arrival time of the initial electromagnetic impulse is shown on each of the traces as 516, 518 and 520. In practice, the arrival time of the initial electromagnetic impulse at all receivers, which should be approximately simultaneous, can be found by cross-correlation of all electromagnetic signals recorded and, if necessary, windowed autocorrelation to produce zero-phase arrivals. This data processing can be done at various points in the process. Referring to FIG. 2, the processing can be done at processing center 340, in unit 330, in unit 320, or in a combination of the three. In the case where the detection of the electromagnetic impulse is used to trigger the recording of ground motion sensor 310, it is preferred that the processing be done in unit 320 such that the impulse can be properly identified.

According to conventional practices, problems have existed in using seismic data alone for characterizing microseismic fracture events. When events are located using 3-component seismic data, both the P and S arrival times are measured. The difference between these arrival times at each ground motion sensor is related to the distance from the event to the ground motion sensor.

Let $t^i_p$ and $t^i_s$ be respectively the arrival times of the P and S waves at station i, and say an accurate P and S velocity model is available. If the event source time is at $t_o$ then the arrival times are given by:

$$t^i_p = t_0 + \int_L \frac{1}{v_p} dL \quad (1)$$

$$t^i_s = t_0 + \int_L \frac{1}{v_s} dL \quad (2)$$

where $v_p$ and $v_s$ are the P and S wave propagation velocities along the ray path L between event and ground motion sensor. By subtraction, $$\delta t^i = \int_L \frac{1}{v_s} - \frac{1}{v_p} dL \quad (3)$$

where $$\delta t^i = t_s^i - t_p^i$$

This equation can be inverted to estimate the length of path L. In a homogeneous, isotropic medium, for instance, the ray path is straight and we obtain $$D^i = \frac{v_p v_s}{v_p - v_s} \delta t^i \quad (4)$$

where $D^i$ is the distance between event and ground motion sensor.

Using formulae 3 or 4, we see that an estimate of the event—receiver distance (along a ray path) can be obtained from the difference between P and S arrival times without knowing the source time $t_o$. Similar measurements from three well-positioned ground motion sensors are sufficient to locate an event, although the more ground motion sensors used the more accurate the relocation will be. In addition, any redundancy in the travel time data can be used to update the velocity model itself. However, as described above, this technique relies entirely on knowledge of both the P and S wave velocity model along the event—receiver path, and on detection of both the P and S arrival times. If either of these models or data types are not available, this method can not be used (unless some other, always less accurate assumptions are introduced). In addition, the effective data $\delta t^i$ will be less accurate than either the original data $t^i_p$ or $t^i_s$.

However, according to the invention, a value of $t_o$ is available from an independent source. Thus, advantageously, either or both of equations 1 and 2 can be used directly, in the same way as equation 3, to estimate the event—receiver distance. Accordingly, more accurate data may be used, and either a P, or an S velocity model is sufficient. In addition, because the source time is independently constrained, there will be added redundancy in the seismic arrival time data (the part of that data that would otherwise be required to constrain the source time), and this provides extra information to constrain the Earth's velocity structure.

Importantly, the propagation of this electromagnetic energy occurs at very high speeds relative to the seismic velocity, and hence in many situations can be regarded as propagating effectively instantaneously in the frequency band mentioned, given typical rocks and distances involved in reservoir monitoring surveys. Hence, when this impulse is recorded and identified in the electromagnetic signal, we can generally regard the impulse onset as the onset of the event source mechanism. In cases where fluid squirting inside the fracture causes the only electromagnetic signal, the use of a physical model of fluid response to fracture occurrence is preferred to infer the exact fracture initiation time from the electromagnetic data.

The arrival time of the electromagnetic impulse provides the time that the induced or man-made seismic event occurred. Advantageously, knowing the time that the microseismic event occurred removes trade-offs between the source time and location that usually dominate inversions for microseismic event relocation using only seismic data.

The impulse on all electromagnetic records occurs almost instantaneously as the fracture is initiated, and can be use to trigger the seismic recording system. Cross-correlation of these electromagnetic signals gives the fracture source time, $T_o$. The seismic P, S and surface wave arrivals occur at later times $T_p$, $T_s$ and after $T_{surface}$ respectively. Since the source time can be accurately known from the electromagnetic record, there is greatly reduced ambiguity about the source time of the seismic P and S waves—one of the limiting factors in microseismic relocation inversions.

Additionally, in cases where the velocity model of the Earth is only very poorly constrained by available data from previous surveys or well logs, the velocity model can not be fixed prior to the location of the event. In such cases, the improvements offered by fixing the event source time are even more significant. This is true even though many seismic arrival times are recorded. In other words, determining the source time independently using electromagnetic data provides accuracy that can not be obtained with the addition of more seismic data.

Besides providing the fracture source time, the electromagnetic waveform contains information about the type of fracture that occurred, and about the induced fluid flow that followed the fracture. Both of these provide valuable insight into the stresses that pertain in the reservoir, certain piezoelectric properties of the rock that fractured, and the amount and type of fluid that exists within the rock pore space. The phase and vectorial components of the electromagnetic signal contain information about the character and direction of the seismic event relative to the recording sensor. The amplitude of arriving electromagnetic energy contains information about the conductivity of rock between the event and receiver.

In addition, because the source time of the induced or man-made seismic event will be known accurately, the arrival times of seismic energy (e.g., P and S waves) can be used to calculate the average seismic wave velocity between the event and ground motion sensors; this provides valuable information that will help to determine the velocity structure of the Earth.

Figure 4:
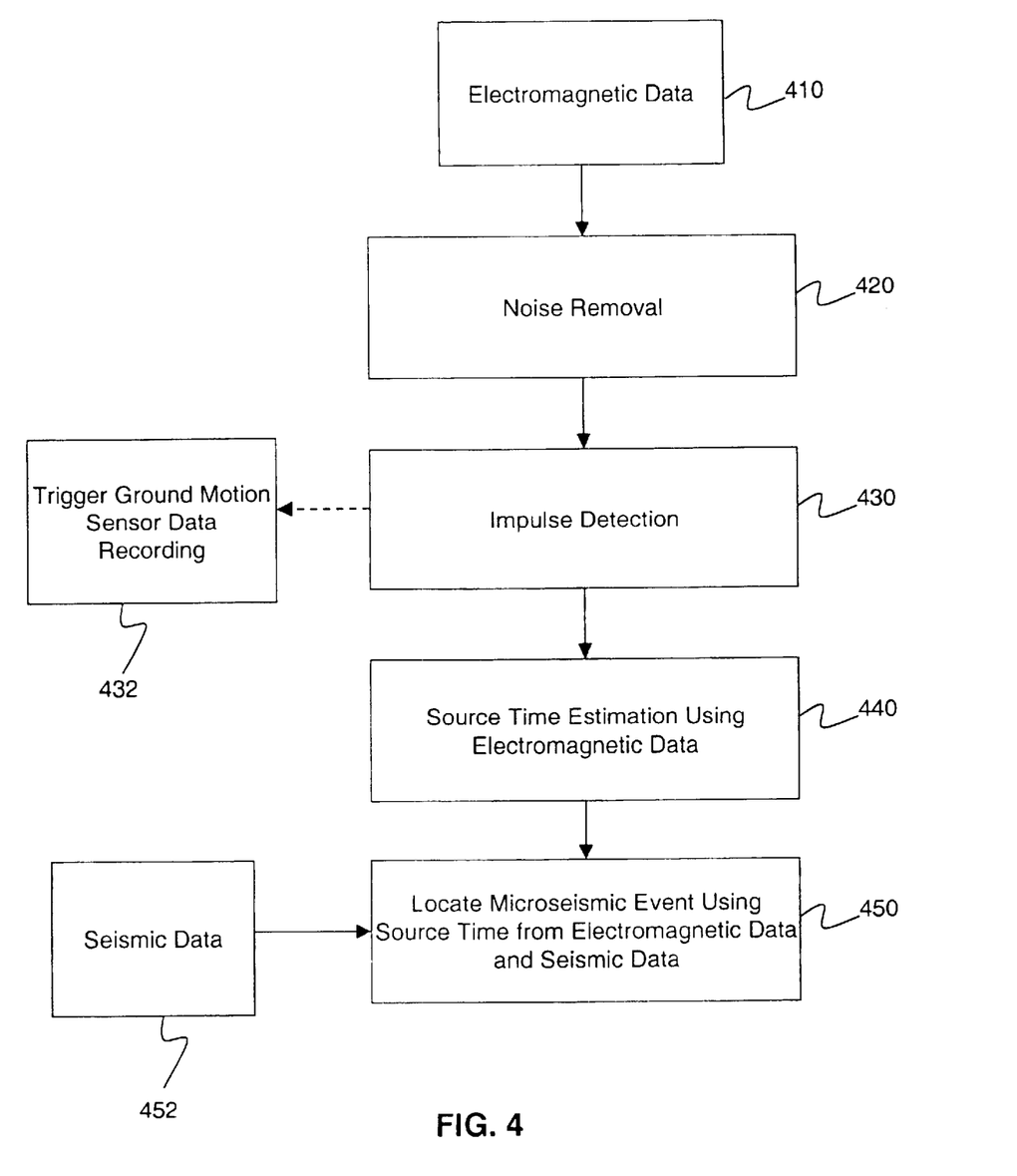
FIG. 4 schematically illustrates steps used to process the electromagnetic and seismic data, according the invention.

FIG. 4 schematically illustrates steps used to process the electromagnetic and seismic data according to the invention. Electromagnetic data 410 is preferably stored in data processing center 340. Noise removal is performed in step 420. The noise removal techniques are preferably tailored to the particular level and type of noise present in the data.

Since electromagnetic waves that propagate deep into the Earth are likely to be those that enter the Earth approximately vertically, telluric currents at depth are likely to be close to horizontal. This is likely to be approximately true of both background (e.g. magnetotelluric) energy and of man-made noise (e.g. from power cables). Hence, noise measured on electrodes in a cased well is likely to be the projection of these horizontal currents onto the axis of the well (since the casing acts like a long antenna). Hence, a strong correlation has been observed between the horizontal surface noise and a noise detected with a sensor within the well. Thus, removing a multiple of the electromagnetic signal measured on the surface from the signal measured in the borehole can effect noise reduction.

In step 430 the impulse is detected. The arrival time of the initial electromagnetic impulse is preferably found by cross-correlation of all electromagnetic signals recorded and, if necessary, windowed autocorrelation to produce zero-phase arrivals.

If the impulse is used to trigger the seismic recording system, then steps 420 and 430 will also be performed to some degree at some location close to the recording equipment. This triggering is denoted by the dotted line to step 432 and by the dashed arrow to ground motion sensor 310 in FIG. 2.

In step 440, the source time is estimated using the electromagnetic data. In cases where there is piezoelectric rock material at the microseismic event, the electromagnetic impulse time is taken as the source time. In cases where fluid squirting inside the fracture causes the only electromagnetic signal, a physical model of the fluid-fracture interaction is used to obtain an estimate of the source time. In step 450, the microseismic event is located using the source time from the electromagnetic data and recorded seismic data 452, according to the techniques described above.

While preferred embodiments of the invention have been described, the descriptions and figures are merely illustrative and are not intended to limit the present invention. Although embodiments of the invention have been described primarily in the context of locating and characterizing microseismic events caused by water or gas injection, the disclosed methods and structures are readily applicable to other applications. For example, the invention is applicable to monitor microseismic events induced by other activity such as the generation of artificial fractures (i.e. fracturing) by injection of fluids and proppants at high pressure, and methods of storing gas by injecting the gas into water reservoirs. The invention is also applicable to locate and characterize microseismic events caused by tunneling or boring activity (e.g. mining, or civil engineering), volcanic and earthquake activity, and geothermal energy installations. Locating and characterizing microseismic events can also be used for monitoring underground dumps, nuclear storage facilities, and potential dam failure.

What is claimed is:

1. A method of determining the location of a microseismic event comprising the steps of:
   receiving electromagnetic data representing electromagnetic energy traveling through the earth that has been measured by an electromagnetic sensor, at least some of the electromagnetic energy being caused by a microseismic event that consists primarily of rock fracturing or activation of existing rock fractures;
   receiving seismic data representing vibrations in the earth caused by said microseismic event, the seismic data being measured using plurality of ground motion sensors;
   estimating the time at which said microseismic event occurred based at least in part on the time at which electromagnetic energy caused by the microseismic event is received by the electromagnetic sensor; and
   determining the location of said microseismic event using the estimated time at which the microseismic event occurred and the time at which the earth vibrations caused by the microseismic event arrived at the ground motion sensors.

2. The method of claim 1 further comprising the step of decreasing the amount of background electromagnetic noise contained in the electromagnetic data.

3. The method of claim 1 wherein the electromagnetic sensor and at least some of the ground motion sensors are located in a borehole used for hydrocarbon production.

4. The method of claim 3 wherein the electromagnetic sensor and at least some of the ground motion sensors are permanently located in the borehole.

5. The method of claim 1 wherein the electromagnetic sensor and at least some of the ground motion sensors are located in a lateral extension from a borehole used for hydrocarbon production.

6. The method of claim 5 wherein the electromagnetic sensor and at least some of the ground motion sensors in the lateral extension are separated from the borehole used for hydrocarbon production such that fluid flow between the borehole and the lateral extension is substantially prevented.

7. The method of claim 5 wherein the electromagnetic sensor and at least some of the ground motion sensors in the lateral extension are permanently cemented into the lateral extension.

8. The method of claim 1 wherein the electromagnetic sensor and at least some of the ground motion sensors are located in a borehole that is not directly used for hydrocarbon production.

9. The method of claim 1 further comprising the step of determining characteristics of the rock fracturing based at least in part on the recorded electromagnetic energy.

10. The method of claim 9 further comprising the step of determining characteristics of a fluid in the region of the rock fracture or of fluid flow in response to the rock fracture.

11. The method of claim 10 further comprising the step of determining characteristics of structures surrounding the location of the rock fracture.

12. The method of claim 1 wherein the step of estimating the time at which the microseismic event occurred comprises detecting an electromagnetic impulse caused by the microseismic event and assigning as the estimated time the time at which the detected impulse is received.

13. The method of claim 1 wherein the step of estimating the time at which the microseismic event occurred comprises applying at least some of the recorded electromagnetic data to a physical model of fluid response to fracture occurrence.

14. The method of claim 1 further comprising the step of injecting water into an injection borehole to facilitate the flow of hydrocarbon material from a production borehole.

15. The method of claim 1 wherein the ground motion sensors comprise geophones.

16. The method of claim 1 wherein the ground motion sensors also measure pressure variations.

17. The method of claim 1 wherein the ground motion sensors measure the motion of the ground in three spatial dimensions.

18. The method of claim 1 wherein the ground motion sensors are located in water.

19. The method of claim 18 wherein the ground motion sensors are located at the sea bottom.

20. The method of claim 1 wherein the range of frequencies detected by the electromagnetic sensor includes about 1 to 1000 hertz.

21. The method of claim 1 wherein the electromagnetic sensor comprises an antenna.

22. The method of claim 1 wherein the electromagnetic sensor comprises an electrode.

23. The method of claim 22 wherein the electromagnetic data has been measured by a plurality of electrodes arranged in a resistivity array.

24. The method of claim 1 further comprising the steps of:
   measuring and recording as data the electromagnetic energy traveling through the earth using an electromagnetic sensor;
   measuring and recording as data seismic energy in the form of vibrations in the earth caused by the microseismic event using plurality of ground motion sensors;
   communicating the recorded electromagnetic data and seismic data to a data processing center, wherein the steps of receiving the data, estimating the time, and determining the location are performed at the data processing center.

25. A method of determining the time of occurrence of a microseismic event and triggering a seismic recording device comprising the steps of:
   measuring electromagnetic energy using an electromagnetic sensor, at least some of the electromagnetic energy being caused by a microseismic event that consists primarily of rock fracturing or activation of existing rock fractures;
   estimating the time at which the microseismic event occurred based on the time at which electromagnetic energy caused by the microseismic event is received by the electromagnetic sensor; and
   initiating recording on a seismic recording device of seismic energy monitored by a ground motion sensor, the recording being initiated in response to the estimated time at which the microseismic event occurred.

26. The method of claim 25 wherein the electromagnetic sensor and the ground motion sensor are located in a borehole used for hydrocarbon production.

27. The method of claim 26 wherein the electromagnetic sensor and the ground motion sensor are permanently located in the borehole.

28. The method of claim 25 wherein the electromagnetic sensor and the ground motion sensor are located in a lateral extension from a borehole used for hydrocarbon production.

29. The method of claim 28 wherein the electromagnetic sensor and the ground motion sensor in the lateral extension are separated from the borehole used for hydrocarbon production such that fluid flow between the borehole and the lateral extension is substantially prevented.

30. The method of claim 28 wherein the electromagnetic sensor and the ground motion sensor in the lateral extension are permanently cemented into the lateral extension.

31. The method of claim 25 wherein the electromagnetic sensor and the ground motion sensor are located in a borehole that is not directly used for hydrocarbon production.

32. The method of claim 25 wherein the microseismic event is primarily man-made.

33. A computer readable medium that carries instructions to direct an apparatus to determine the location of a microseismic event by performing steps comprising:
- receiving electromagnetic data representing electromagnetic energy traveling through the earth that has been measured by an electromagnetic sensor, at least some of the electromagnetic energy being caused by a microseismic event that consists primarily of rock fracturing or activation of existing rock fractures;
- receiving seismic data representing vibrations in the earth caused by said microseismic event, the seismic data being measured using plurality of ground motion sensors;
- estimating the time at which said microseismic event occurred based at least in part on the time at which electromagnetic energy caused by the microseismic event is received by the electromagnetic sensor; and
- determining the location of said microseismic event using the estimated time at which the microseismic event occurred and the time at which the earth vibrations caused by the microseismic event arrived at the ground motion sensors.

34. A system for determining the location of a microseismic event comprising:
- a plurality of ground motion sensors adapted to detect vibrations in the earth caused by a microseismic event that consists primarily of rock fracturing or activation of existing rock fractures;
- an electromagnetic sensor adapted to detect electromagnetic energy traveling through the earth caused by the microseismic event, the electromagnetic sensor generating data for an estimation of the time at which said microseismic event occurs based at least in part on the time at which electromagnetic energy caused by the microseismic event is received by the electromagnetic sensor; and
- a processor adapted to determine the location of said microseismic event using said estimation of time and the time at which the earth vibrations caused by the microseismic event arrived at said ground motion sensors,
- said ground motion sensors and said electromagnetic sensors being located within a borehole, a lateral extension of said borehole or at the ground surface.

35. A system according to claim 34 wherein the electromagnetic sensor and at least some of the ground motion sensors are located in a borehole used for hydrocarbon production.

36. A system according to claim 35 wherein the electromagnetic sensor and at least some of the ground motion sensors are permanently located in the borehole.

37. A system according to claim 34 wherein the electromagnetic sensor and at least some of the ground motion sensors in the lateral extension are separated from the borehole used for hydrocarbon production such that fluid flow between the borehole and the lateral extension is substantially prevented.

38. A system according to claim 34 wherein the electromagnetic sensor and at least some of the ground motion sensors are located in a borehole that is not directly used for hydrocarbon production.

39. A system according to claim 34 further comprising the step of determining characteristics of the rock fracturing and/or nearby fluid based at least in part on the recorded electromagnetic energy.

40. A system according to claim 34 wherein the ground motion sensors comprise geophones.

41. A system according to claim 34 wherein the range of frequencies detected by the electromagnetic sensor includes about 1 to 1000 hertz.

42. A system according to claim 34 wherein the electromagnetic sensor comprises an antenna.

43. A system according to claim 34 wherein the electromagnetic sensor comprises an electrode.

44. A system according to claim 34 wherein the electromagnetic sensor comprises a plurality of electrodes arranged in a resistivity array.

45. A system according to claim 34 wherein recording on a seismic recording device of seismic energy monitored by at least one of the ground motion sensors is initiated in response to the estimated time at which the microseismic event occurred.

* * * * *